US 6,691,007 B2

(12) United States Patent
Haugse et al.

(10) Patent No.: US 6,691,007 B2
(45) Date of Patent: Feb. 10, 2004

(54) VEHICLE CONDITION MONITORING SYSTEM

(75) Inventors: Eric D. Haugse, Seattle, WA (US); Roy Ikegami, Seattle, WA (US); Angela Trego, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/116,653

(22) Filed: Apr. 4, 2002

(65) Prior Publication Data

US 2003/0191564 A1 Oct. 9, 2003

(51) Int. Cl.$^7$ .............................................. G06F 19/00
(52) U.S. Cl. ............................ 701/29; 701/30; 701/34; 701/35; 702/183; 702/188
(58) Field of Search ............................ 701/29, 30, 34, 701/35; 702/183, 188

(56) References Cited

U.S. PATENT DOCUMENTS 4,989,146 A * 1/1991 Imajo .......................... 701/35

OTHER PUBLICATIONS

US 2001/0041954 A1 which is U.S. Ser. No. 09/840,877 filed Apr. 25, 2001.*
US 2002/0198640 A1 which is U.S. Ser. No. 09/891,644 filed Jun. 25, 2001.*

* cited by examiner

Primary Examiner—William A Cuchlinski, Jr.
Assistant Examiner—Eric M Gibson
(74) Attorney, Agent, or Firm—Black Lowe & Graham PLLC

(57) ABSTRACT

The present invention is a system and method for monitoring conditions of a vehicle and generating a maintenance plan according to the monitored conditions. The system includes one or more sensors and a data acquisition unit located within the vehicle. The one or more sensors generate signals of a condition from various locations within the vehicle. The data acquisition unit stores the generated sensor signals at a first sampling rate. The system also includes a structural condition management system that receives the stored sensor signals from the data acquisition unit. The structural condition management system is external to the vehicle. The structural condition management system processes the transmitted sensor signals based on one or more associated predefined condition assessment algorithms and generates a maintenance plan based on the processed sensor signals.

19 Claims, 4 Drawing Sheets

VEHICLE CONDITION MONITORING SYSTEM

FIELD OF THE INVENTION

This invention relates generally to vehicle maintenance systems and, more specifically, to data acquisition relating to vehicle condition.

BACKGROUND OF THE INVENTION

Total life cycle costs for vehicles includes costs for operating and maintaining the vehicles. In many instances, vehicles must be inspected before maintenance can be performed on the vehicles.

A significant portion of the cost of inspecting vehicles, such as aircraft, for corrosion, stress or other damage is associated with obtaining access to hidden parts of the vehicle's structure. For example, for a 747-400 commercial transport aircraft over 36,000 labor hours are spent inspecting the aircraft for fatigue cracks and corrosion. Of these, 25,000 hours are spent inspecting for corrosion. Over 21,000 hours or 84% of these hours are spent gaining access to hard to inspect areas, and only 16% or 4000 hours are spent doing the actual inspection. In addition, added costs are associated with incidental damage that may be inflicted upon the structure while gaining access to hidden areas.

Therefore, there is a need to develop a system and process for reducing the time to complete vehicle inspections.

SUMMARY OF THE INVENTION

The invention provides a system and method for reducing structural condition maintenance costs by monitoring vehicle condition in real-time.

The present invention is a system and method for monitoring conditions of a vehicle and generating a maintenance plan according to the monitored conditions. The system includes one or more sensors and a data acquisition unit located within the vehicle. The one or more sensors generate signals of a condition from various locations within the vehicle. The data acquisition unit stores the generated sensor signals at a first sampling rate. The system also includes a structural condition management system that receives the stored sensor signals from the data acquisition unit. The structural condition management system is external to the vehicle. The structural condition management system processes the transmitted sensor signals based on one or more associated predefined condition assessment algorithms and generates a maintenance plan based on the processed sensor signals.

The data acquisition unit determines if the generated sensor signals need to be stored at a sampling rate different than the first sampling rate. The generated sensor signals are stored at a sampling rate different than the first sampling rate, if it is determined the stored sensor signals need to be stored at a different sampling rate.

The one or more sensors suitably include at least one of a corrosion, humidity, pH, chloride ion ($Cl^-$), metal ion, temperature, acceleration, stress, strain, pressure, load, or force sensor.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
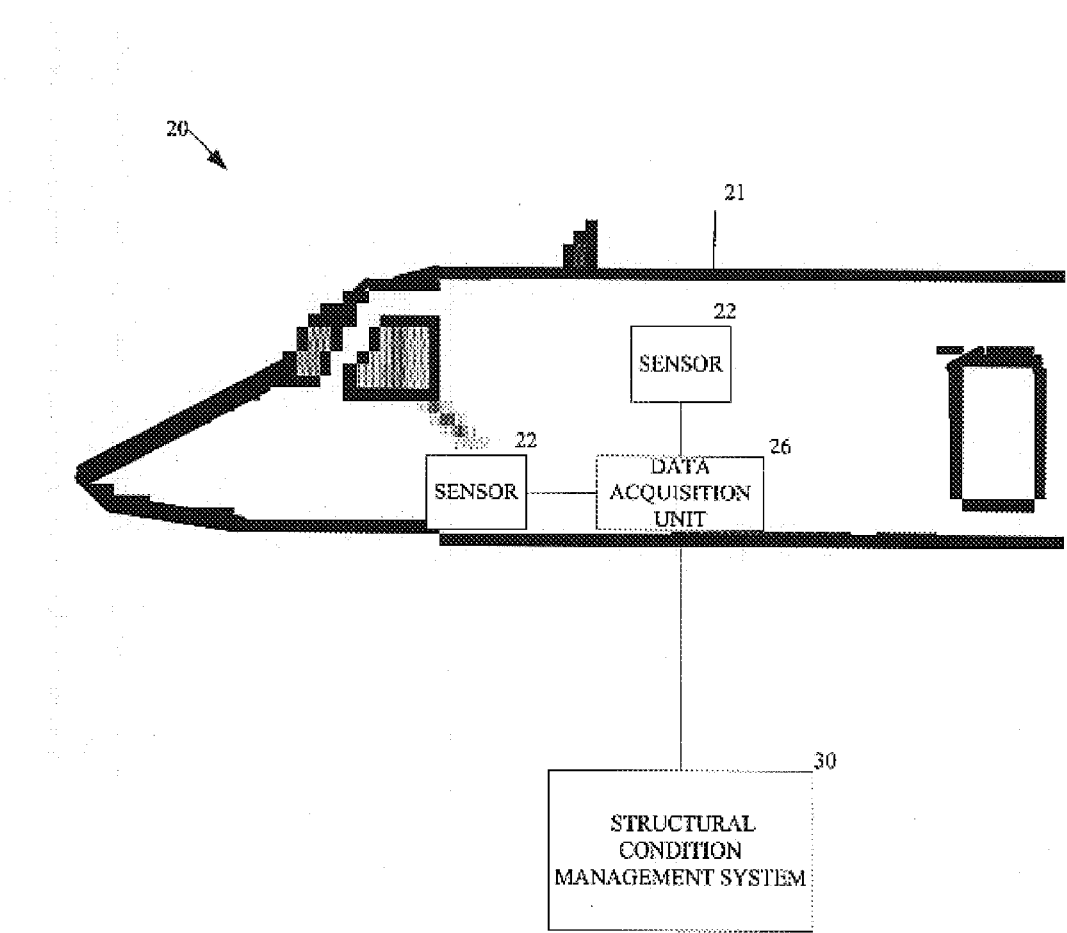
FIG. 1 illustrates components of the present invention implemented in an aircraft.

The present invention provides a system and method for acquiring vehicle condition information in a non-intrusive, efficient manner for allowing damage and usage analysis. As shown in FIG. 1, a condition data acquisition system 20 is located in a vehicle 21 and includes one or more sensors 22 electrically or optically coupled to a data acquisition unit 26. The sensors 22 generate electrical or photonic signals that reflect a condition in which the sensors 22 were designed to detect. The data acquisition unit 26 acquires the electrical or photonics signals from the sensors 22 and processes the received electrical or photonics signals for analysis by a structural condition management system 30 that is external to the vehicle. The data acquisition unit 26 may perform some diagnostic or prognostic preprocessing of the received signals based on the type of signal received and a predefined test to be performed on the received signals. It will be appreciated that the structural condition management system 30 is a system that is presently used in many vehicle continued maintenance programs, such as that used in the airline industry. The present invention provides an electrical or wireless connection between the data acquisition unit 26 and the structural condition management system 30 for allowing the delivery of the sensed electrical or photonics signals from the data acquisition unit 26 to the structural condition management system 30. It will be appreciated that the vehicle can be an aircraft, spacecraft, launch vehicle, seaborne or undersea vessel, or ground-based vehicle.

A number of digital signal processing algorithms are available to be coded into the data acquisition unit 26 to perform functions such as filtering and data compression, Fourier transforms, power spectral density calculations on dynamic data, and diagnosis of the sensed structural component such as fatigue life and usage, overload conditions and environmental exposures, etc. The structure condition management system 30 is a computer system such as a laptop or personal computer that takes the sensor data and the coded processing algorithms and performs additional diagnostics assessments of the structural condition (health). The structure condition management system 30 includes prognostics algorithms that assess the current state (health) of the vehicle 21 to predict the condition at some future time given some assumed loading, usage, scenario, or environmental exposure. The prognostics algorithms can include crack growth or strain-life models, corrosion damage predictive models, or other residual strength and life predictive models. The structure condition management system 30 then stores the data in a format specified by vehicle maintenance personnel for the purpose of planning future maintenance actions.

Some of the sensors 22 are prepositioned in the vehicle in hidden locations that would require physical deconstruction of the vehicle for proper condition inspection to be completed using known inspection methods. [This refers to prior inspection methods] The sensors 22 are suitable off-the-shelf micro-electromechanical devices (MEMS), or extrinsic Fabry-Perot interferometric (EFPI), long-period grating (LPG), and fiber Bragg grating (FBG) fiber optic sensors. The sensors 22 suitably include corrosion, humidity, pH, chloride ion (Cl$^-$), metal ion, temperature, acceleration, stress, strain, pressure, load, and force sensors. Fiber optic sensors are relatively tolerant or immune to the effects of high-temperature, high-electromagnetic interference (EMI), and highly corrosive environments. In one non-limiting example, the sensor is an LPG fiber optic moisture sensor that is located in areas of a vehicle where water can pool or cause problems, such as under floors of lavatories and galleys, inside insulation around doors, and in bilge areas.

Figure 2:
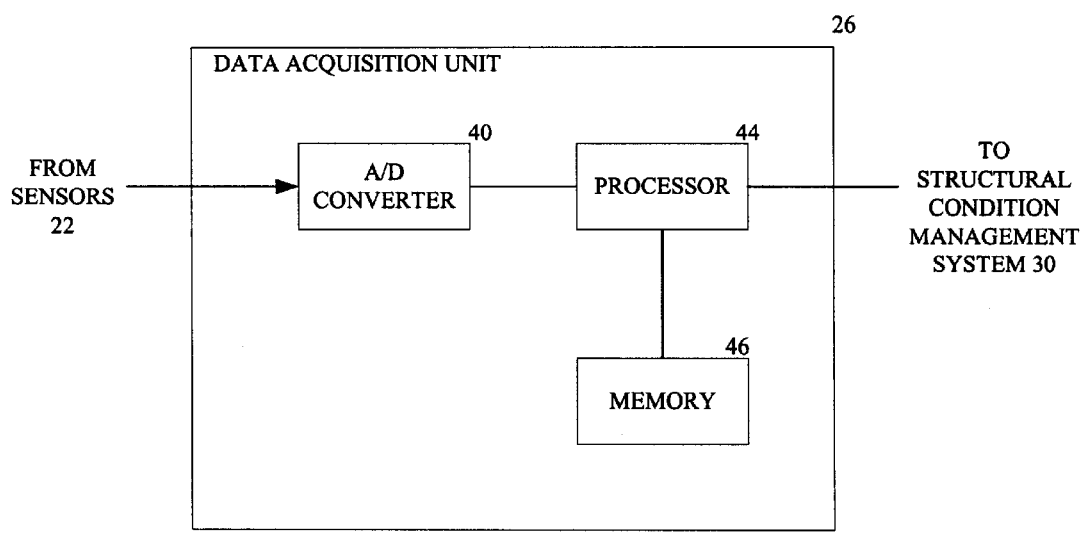
FIG. 2 illustrates the components of a data acquisition unit implemented within a vehicle.

FIG. 2 illustrates that the data acquisition unit 26 includes an analog-to-digital (A/D) converter 40, a signal processor 44, and memory 46. The A/D converter 40 receives the signals from the sensors 22, converts the received signals into digital signal format, and sends the digital signals to the signal processor 44. The signal processor 44 processes the signals received from the sensors 22 to generate digital data and stores the digital data in the memory 46. After the structural condition management system 30 is connected to the data acquisition unit 26, the signal processor 44 retrieves the stored digital data from the memory 46 based on requests from the structural condition management system 30. In one non-limiting example, an RS-232 serial port interface allows a connection to various computer or data downloading serial port devices, such as personal data assistants, laptop computers, or a direct or wireless connection to the structural condition management system 30. It will be appreciated that other interface devices can be used to allow the data acquisition unit 26 to transmit data to external devices.

In one non-limiting embodiment, the data acquisition unit 26 is powered by a battery not coupled to any other components of the vehicle. The data acquisition unit 26 with a battery becomes a stand-alone system that does not rely on the functionality of any other vehicle system.

Figure 3:
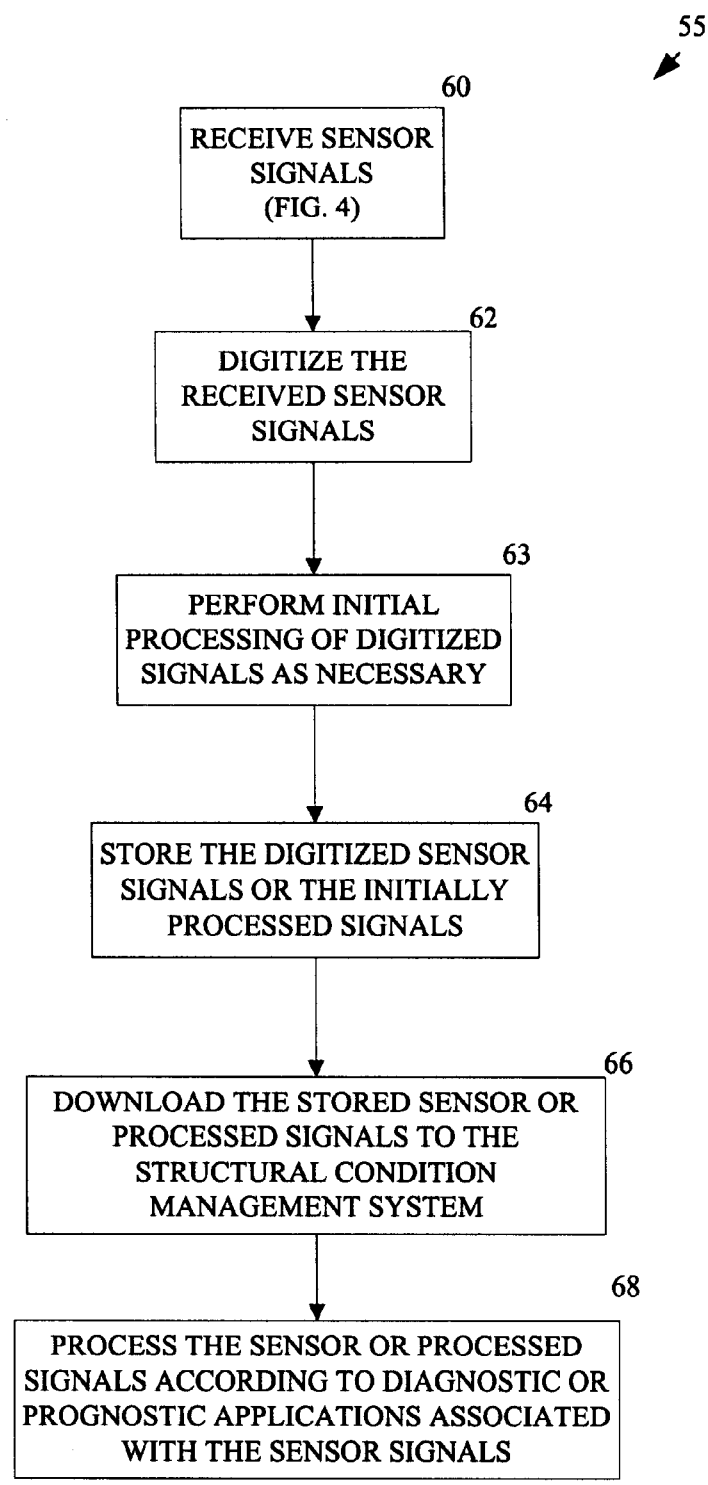
FIGS. 3 and 4 are flow diagrams illustrating example data acquisition processes performed by the components shown in FIGS. 1 and 2.

FIG. 3 illustrates an exemplary process 55 performed by the condition data acquisition system 20 and the structural condition management system 30. First, at block 60, the data acquisition unit 26 receives signals from the sensors 22. An exemplary sampling process for the reception of signals is described in more detail below in FIG. 4. Next, at block 62, the data acquisition unit 26 digitizes the received signals from the sensors 22. At block 63, the data acquisition unit 26 performs initial processing of the digitized signals based on diagnostic or prognostic algorithms executed by the unit 26. The type of diagnostic algorithm used is based on the type of sensor that sends the signal. At block 64, the data acquisition unit 26 stores the digitized and processed signals for later use. Then, at block 66, the stored digitized and processed signals are downloaded to the structural condition management system 30. The download of the stored digitized and processed signals is preferably performed at a scheduled maintenance period. Finally, at a block 68, the structural condition management system 30 processes and analyzes the downloaded digitized and processed signals according to associated diagnostic or prognostic application programs executed by the structural condition management system 30.

Results of the diagnostic or prognostic application programs produce a condition maintenance plan for the vehicle 21. The diagnostic application programs determine vehicle condition by analyzing the sensor signals. The prognostic application programs predict future vehicle condition by analyzing the sensor signals based on some assumed usage scenario. In one non-limiting example, the analyzed signal from a first corrosion sensor indicates a non-corrosion condition at the portion of the vehicle proximate to the first corrosion sensor. Thus, non-maintenance of the portion of the vehicle proximate to the first corrosion sensor is included in the structural condition maintenance plan. However, the analyzed signal from a second corrosion sensor indicates a corrosion condition existing at the portion of the vehicle proximate to the second corrosion sensor. With regards to the portion of the vehicle proximate to the second corrosion sensor, the structural condition maintenance plan includes required inspection and/or maintenance for the affected portion of the vehicle.

Figure 4:
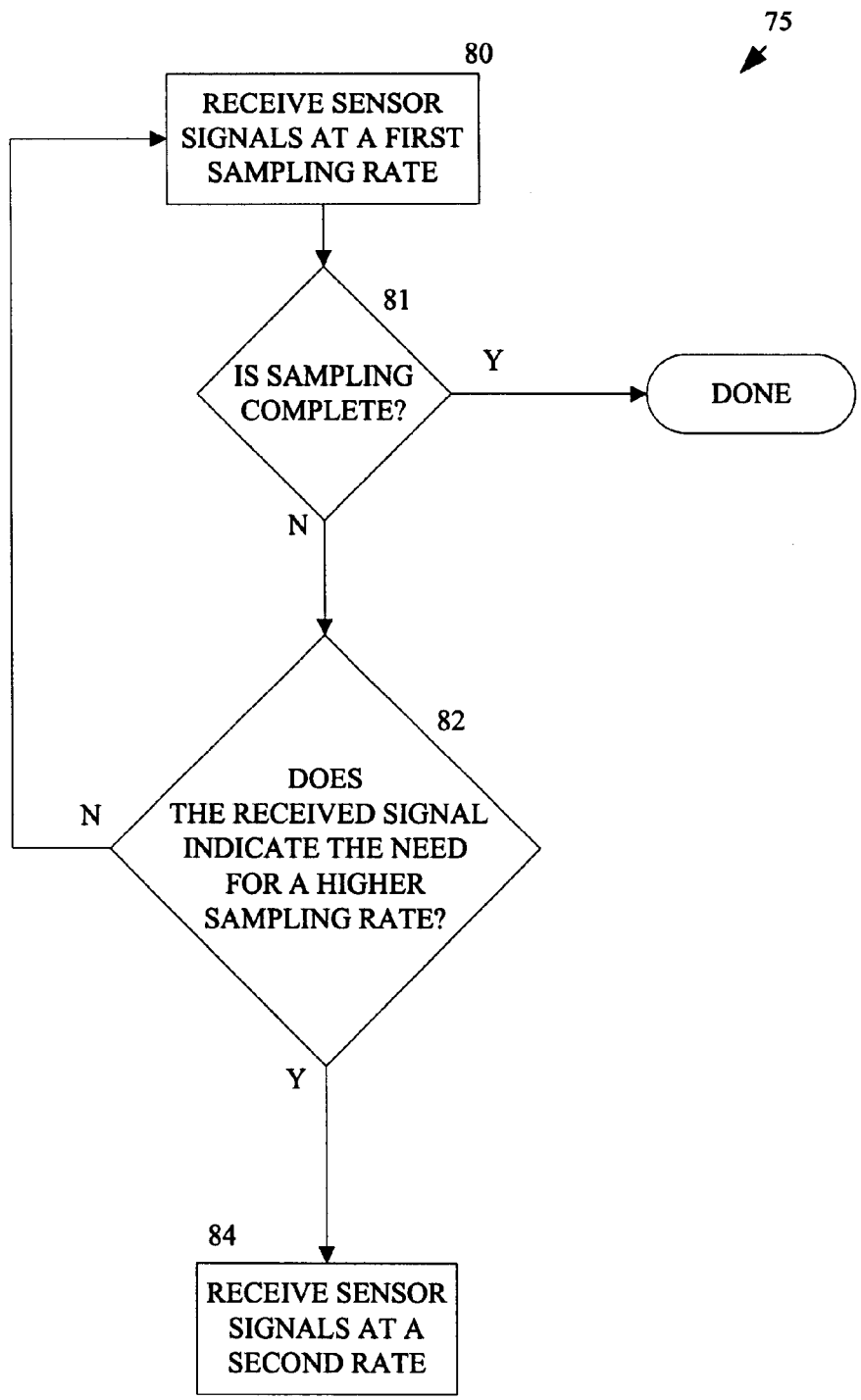

FIG. 4 illustrates an exemplary sensor signal reception process 75. First, at block 80, the signals are received from the sensor at a first sampling rate. Next, at decision block 81, the process continues provided a sampling threshold has not been reached. For example, the threshold could be prescheduled maintenance shut down. At decision block 82, the signal processor 44 determines if the received signals indicate the need for a higher sampling rate. A non-limiting example of an indication for a need for a higher sampling rate is if the sensor is a temperature sensor and the received temperature signal differs from previously received temperature signals by more than a threshold amount. The analysis performed at decision block 82 is performed by a sampling signal analysis application program executed by the signal processor 44. If, at decision block 82 there is no indication for a need for a higher sampling rate, the process continues sampling at the first sampling rate. However, if at decision block 82, there is an indication for a need for a higher sampling rate, the sensor signals are sampled at a second sampling rate, which is higher than the first sampling rate, see block 84. It will be appreciated that additional sampling rates can be applied based on various sampling rate needs of the data acquisition unit 26.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for monitoring condition of structure of a vehicle, the method comprising:

generating signals relating to a structural condition of the vehicle at one or more condition sensors positioned in the vehicle;

storing at a first sampling rate the generated sensor signals at a data acquisition unit within the vehicle;

transmitting the stored sensor signals from the data acquisition unit to a structural condition management system;

processing the transmitted sensor signals at the structural condition management system based on one or more associated predefined condition assessment algorithms; and generating a maintenance plan based on the processed sensor signals.

2. The method of claim 1, further comprising preprocessing the generated signals based on at least one of a diagnostic or prognostic algorithm.

3. The method of claim 1, wherein storing includes:

determining whether the stored signals are to be stored at a first sampling rate; and storing the generated sensor signals at a second sampling rate that is different than the first sampling rate when it is determined that the generated sensor signals are not to be stored at the first sampling rate.

4. The method of claim 1, wherein the one or more sensors include at least one of a corrosion, humidity, pH, chloride ion, metal ion, temperature, acceleration, stress, strain, pressure, load, or force sensor.

5. A system for monitoring condition of structure of a vehicle, the system comprising:
   one or more sensors for generating signals relating to a structural condition of the vehicle from a location in the vehicle;
   a data acquisition unit for storing the generated sensor signals at a first sampling rate; and
   a structural condition management system for receiving the stored sensor signals from the data acquisition unit, processing the received sensor signals based on one or more associated predefined condition assessment algorithms, and generating a maintenance plan based on the processed sensor signals,
   wherein the structural condition management system is external to the vehicle.

6. The system of claim 5, wherein the data acquisition unit performs preprocessing of the generated signals based on at least one of a diagnostic or prognostic algorithm.

7. The system of claim 5, wherein the data acquisition unit determines whether the generated sensor signals are to be stored at the first sampling rate, and stores the generated sensor signals at a second sampling rate that is different than the first sampling rate when it is determined that the stored sensor signals are not to be stored at the first sampling rate.

8. The system of claim 5, wherein the one or more sensors include at least one of a corrosion, humidity, pH, chloride ion, metal ion, temperature, acceleration, stress, strain, pressure, load, or force sensor.

9. The system of claim 5, wherein the system includes a self-contained power supply.

10. A vehicle comprising:
    one or more sensors for generating signals relating to a structural condition of the vehicle from a location in the vehicle; and
    a data acquisition unit for storing the generated sensor signals at a first sampling rate,
    wherein the data acquisition unit determines whether the generated sensor signals are to be stored at the first sampling rate, and stores the generated sensor signals at a second sampling rate that is different than the first sampling rate when it is determined that the stored sensor signals are not to be stored at the first sampling rate.

11. The vehicle of claim 10, wherein the one or more sensors include at least one of a corrosion, humidity, pH, chloride ion, metal ion, temperature, acceleration, stress, strain, pressure, load, or force sensor.

12. The vehicle of claim 10, wherein the data acquisition unit performs preprocessing of the generated signals based on at least one of a diagnostic or prognostic algorithm.

13. A system for generating a maintenance plan for a vehicle, the system comprising:
    one or more sensors for generating signals relating to a structural condition of the vehicle from a location in the vehicle;
    a data acquisition unit for storing the generated sensor signals at a first sampling rate; and
    a structural condition management system for receiving the stored sensor signals from the data acquisition unit, processing the received sensor signals based on one or more associated predefined condition assessment algorithms, and generating a maintenance plan based on the processed sensor signals, wherein the structural condition management system is external to the vehicle.

14. The system of claim 13, wherein the data acquisition unit determines whether the generated sensor signals are to be stored at the first sampling rate, and stores the generated sensor signals at a second sampling rate that is different than the first sampling rate when it is determined that the stored sensor signals are not to be stored at the first sampling rate.

15. The system of claim 13, wherein the one or more sensors include at least one of a corrosion, humidity, pH, chloride ion, metal ion, temperature, acceleration, stress, strain, pressure, load, or force sensor.

16. The system of claim 13, wherein the data acquisition unit performs preprocessing of the generated signals based on at least one of a diagnostic or prognostic algorithm.

17. The system of claim 13, wherein one or more of the sensors are fiber optic sensors.

18. A method for monitoring condition of structure of a vehicle, the method comprising:
    generating signals relating to a structural condition of the vehicle at one or more condition sensors positioned in the vehicle; and
    storing at a first sampling rate the generated sensor signals at a data acquisition unit within the vehicle, wherein storing includes:
       determining whether the stored signals are to be stored a first sampling rate; and
       storing the generated sensor signals at a second sampling rate that is different than the first sampling rate when it is determined that the generated sensor signals are not to be stored at the first sampling rate.

19. A system for monitoring condition of structure of a vehicle, the system comprising:
    one or more sensors for generating signals relating to a structural condition of the vehicle from a location in the vehicle; and
    a data acquisition unit for storing the generated sensor signals at a first sampling rate, wherein the data acquisition unit determines whether the generated sensor signals are to be stored at the first sampling rate, and stores the generated sensor signals at a second sampling rate that is different than the first sampling rate when it is determined that the stored sensor signals are not to be stored at the first sampling rate.

\* \* \* \* \*